(12) United States Patent
Chang et al.

(10) Patent No.: US 7,870,121 B2
(45) Date of Patent: Jan. 11, 2011

(54) MATCHING UP XML QUERY EXPRESSION FOR XML TABLE INDEX LOOKUP DURING QUERY REWRITE

(75) Inventors: Hui Joe Chang, Fremont, CA (US); Zhen Hua Liu, San Mateo, CA (US); Vikas Arora, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 354 days.

(21) Appl. No.: 12/014,238

(22) Filed: Jan. 15, 2008

(65) Prior Publication Data
US 2009/0182762 A1 Jul. 16, 2009

(51) Int. Cl.
*G06F 17/30* (2006.01)
(52) U.S. Cl. .................................................... 707/713
(58) Field of Classification Search ................ 707/1–6, 707/10, 100, 104.1, 713, 715
See application file for complete search history.

(56) References Cited

U.S. PATENT DOCUMENTS

| | | | |
|---|---|---|---|
| 6,366,934 B1 | 4/2002 | Cheng et al. | |
| 6,708,186 B1 | 3/2004 | Claborn et al. | |
| 7,146,365 B2 | 12/2006 | Allen et al. | |
| 7,644,066 B2 * | 1/2010 | Krishnaprasad et al. | 1/1 |
| 2001/0037345 A1 | 11/2001 | Kiernan et al. | |
| 2005/0091188 A1 | 4/2005 | Pal et al. | |
| 2005/0097084 A1 | 5/2005 | Balmin et al. | |
| 2007/0239681 A1 | 10/2007 | Krishnaprasad et al. | |
| 2008/0120321 A1 * | 5/2008 | Liu et al. | 707/102 |

OTHER PUBLICATIONS

Nicola, M., "Exploit XML indexes for XML query performance in DB2 9" downloaded Mar. 31, 2008 from the Internet < http://www.ibm.com/developerworks/db2/library/techarticle/dm-0611nicola/ > pp. 1-3.

* cited by examiner

*Primary Examiner*—Cam-Linh Nguyen
(74) *Attorney, Agent, or Firm*—Hickman Palermo Truong & Becker LLP; Daniel D. Ledesma

(57) ABSTRACT

Techniques are provided for determining whether an XML table index may be used when executing an XML query. An XML table index is defined with a row pattern expression and one or more column pattern expressions. In one technique, an index expression is generated for each row pattern expression-column pattern expression combination. An expression included in the XML query ("query expression") is compared against one or more of the index expressions. In another technique, even if a query expression does not exactly match a row pattern expression, it is determined whether the query expression is equivalent to the row pattern expression. In another technique, even if a query expression does not exactly match and a row pattern expression, it is determined whether the query expression is "contained by" the row pattern expression.

28 Claims, 2 Drawing Sheets

MATCHING UP XML QUERY EXPRESSION FOR XML TABLE INDEX LOOKUP DURING QUERY REWRITE

CROSS RELATED REFERENCES

This application is related to U.S. patent application Ser. No. 11/394,878 filed on Mar. 31, 2006, entitled "Techniques Of Efficient XML Meta-Data Query Using XML Table Index".

FIELD OF THE INVENTION

The present invention relates to database systems and, more particularly, to determining whether an index can be used to process an XML query.

BACKGROUND

Relational Database Management Systems ("DBMS") typically support a wide range of data types. For example, a DBMS allows users to store and query scalar data type values such as integers, numbers, and strings. Some DBMSs have the added ability to support more complex data types. For instance, some DBMSs have the ability to support Extended Markup Language ("XML") documents and other XML type data. Those DBMSs that include XML support allow users to define tables, or columns in a table, as an XML type (e.g., as XMLType). This added support facilitates the inclusion of more sophisticated data in DBMSs. However, with the addition of complex data types, new techniques had to be created to handle storage and access issues.

I. XML Type Storage Techniques

XML data does not naturally lend itself to conventional physical storage models in a DBMS. Thus, a variety of storage techniques can be used to manage the storage of such data. For example, two models for storing XML type data in a database include storing the data object-relationally or storing the data in aggregate form.

A. Object-Relational Storage

Storing XML type data object-relationally involves defining a complex database representation, defined in terms of data types, handled by the database system, referred to herein as database types, to represent XML documents. Database types include, for example, native database types, such as integer and VARCHAR ("variable length character string"), or object types defined for a database system using a DDL statements (data definition language statements).

Within a database representation of an XML document, various database objects are defined to represent and store elements and various components of an XML document. For example, each element of an XML document may be represented by a column in a table. A given XML document is stored in a row of the table. A particular element value of the XML document is stored in the row's column that represents the element.

Another example of a database representation is an object class defined by an object relational database system. Each object of the object class is an instance of an object database system. An object that is an instance of the object class defines, for example, the structure corresponding to an element, and includes references or pointers to objects representing the immediate descendants of the element.

The underlying structures that comprise a database representation (e.g. table, object table, columns, object columns) are referred to as base database objects or structures. When an XML document is submitted to the DBMS for storage, the XML document is "shredded" into element values, which are stored in corresponding components of the base structures. For example, an XML-based resume document would be shredded into various elements such as name, email, telephone number, work experience, and other elements. After the document is shredded, a new row is created in a resume table and each value from the shredded resume is placed in the column corresponding to the value's element.

In some instances, there may be multiple values for a particular type of element in a document. For example, a resume document has as an element "working history." Under this particular element type, the applicant has his previous jobs. In other words, the working history element consists of a list of jobs. In such a case, a separate table may be created for that particular type of element and a reference to the separate table is added to the resume table.

To further illustrate, a purchaseOrder document 100 in FIG. 1 may be considered. PurchaseOrder document 100 is an example of an XML document that may be submitted to a database server. PurchaseOrder document 100 is an XML document that defines a purchase order with the following elements: Reference (reference number), ShipAddrCity (shipping address city), BillAddrCity (billing address city), and LineItems. A LineItem element has additional sub-elements of ItemName, ItemQuantity (e.g., 3 CPUs and 3 Memory chips), and ItemUnitPrice.

If each element in the purchaseOrder has a corresponding column in the table schema, then the document shown in FIG. 1 may be shredded and placed in an object-relational table. The scalar values from the document are placed in the columns based on their element type. Table 2 illustrates an example of an object-relational table for purchaseOrder. The table for purchaseOrder is an XML type table.

TABLE 1

Parent table for Purchase Order

| Purchase Order | Reference | ShipAddrCity | BillAddrCity | LineItem |
|---|---|---|---|---|
| Rid1 | GHB3567 | Oakland | Berkley | LineItem Table Ptr (e.g. LineItem Table at Rid1 and Rid) |

In Table 1, each value from the purchaseOrder document 100 is placed in a column based on that value's element type. For example, reference number "GHB3567" is placed in the reference column, shipping address city "Oakland" is placed in the ShipAddrCity column, etc. At a point during the shredding, the DBMS detects that multiple values are listed for lineItems. Accordingly, a second table is used to store the lineItems. A reference is added to the purchaseOrder table, which points the secondary lineItem table. Table 2 illustrates an example of the lineItem object-relational table for purchaseOrder document 100.

TABLE 2

Child table for Purchase Order

| LineItem | ItemNo | ItemName | ItemQuantity | ItemUnitPrice |
|---|---|---|---|---|
| Rid1 | 34 | CPU | 3 | 123.45 |
| Rid2 | 68 | Memory | 3 | 23.45 |

Unfortunately, many XML documents and other forms of complex data do not conform to the pre-defined schema. For instance, resumes typically include some common features such name, address, and telephone number, but they often also include features that are not necessarily included in every resume. Those less common features may include, for example, items such as hobbies, publications, internship data, research projects, and references. In an object-relational model, when the DBMS attempts to import an XML document that includes data that does not conform to the defined schema, the document (or at least important data in the document) may be ignored, deleted, dumped, etc. To address this problem, developers may attempt to create a column for every different type of element or feature that may possibly be submitted to the DBMS. This strategy, however, is not very practical, because even with their best efforts, database developers may not account for every potential variation on an element name or value type. Moreover, as more columns are defined in the table, each new row in the table consumes more space. When a new row is added, the DBMS typically allocates space for an entire row, regardless of whether data is placed in each column of that row. This has the potential to waste a lot of space.

As an alternative, aggregate storage techniques, such as CLOBs and BLOBs, may be used to store XML type data.

B. Aggregate Storage (LOB-Based Storage)

In aggregate storage, a complex database representation is not used to represent a XML document. XML documents are stored in aggregate form in a LOB ("large binary object"). For example, XML documents may be stored as CLOBs (Character Large Objects) and/or BLOBs (Binary Large Objects). A base structure for storing a collection of XML documents stored in aggregate storage form ("aggregate form") may be, for example, a collection of XML documents stored in a LOB table.

Aggregate storage is useful for storing complex data because aggregate storage can be used to store data regardless of format and/or schema. For instance, when an XML resume is added to a LOB-based table, the resume is stored as one large chunk of data without performing any parsing or shredding of the content. Tables using LOB-based storage to store complex data typically contain very few actual values extracted from the complex data. Instead, the tables consist of references to the aggregate storage locations. In the resume example, when a new resume is added to LOB-based storage, a row is added to a resume table and includes a reference to point to the aggregate storage location where the new resume was stored.

These aggregate storage techniques avoid the overhead associated with analyzing, parsing, and shredding documents. Moreover, these techniques help save storage space, since LOB-based storage makes better use of the underlying storage.

The main drawback to aggregate storage techniques is that queries on the data are much more inefficient, time consuming, and resource intensive than queries made on data stored using object-relational techniques. Part of the reason for this drawback is that the mechanisms that enhance access to object-relationally stored data are unavailable for XML type data stored in aggregate form. Other forms of storage, such as serialized tree storage or object storage, have the same problem.

II. XML Table Index

Based on the foregoing problems and disadvantages, a new XML index structure has been developed, which is described in U.S. patent application Ser. No. 11/394,878, entitled TECHNIQUES OF EFFICIENT XML META-DATA QUERY USING XML TABLE INDEX, filed on Mar. 31, 2006, which is incorporated herein by reference as if fully disclosed herein. This new XML index structure is referred to herein as an "XML table index."

An XML table index is an index that includes a table that indexes a collection of XML documents. An XML table index may itself be indexed by secondary indexes (e.g., B-tree index). In an embodiment, an XML table index is created for XML documents stored in aggregate storage. An XML table index projects out data from a collection of XML documents into column form instead of row form. For example, rather than storing values for several different elements in the same column, but in separate rows (e.g., as an XML index path table), an XML table index stores values in separate columns, one for each element, with fewer rows.

When the data are projected into column form, query techniques used for optimizing access to object-relationally stored XML type data may also be used for XML type data stored in aggregate form. Moreover, when an XML table index is generated, both the overhead of shredding the XML documents into object-relational format and the need for a well-defined XML schema are avoided. XML data may remain in aggregate form, but with the creation of XML table indexes, queries for frequently requested data run more efficiently. Thus, the principles of object-relational storage may be applied to XML documents stored in aggregate storage.

To generate an XML table index for an example Purchase Order document, a "create index" command is executed. An example "create" statement is illustrated below (Create Statement 1).

```
CREATE INDEX POIndex ON PurchaseOrder(object_value)
IndexType is XDB.XMLTableIndex
PARAMETERS('XMLTABLE PO_TAB_INDEX "/
PurchaseOrder//lineItem"
    Columns  ItemNo number path '@itemNo',
             ItemName varchar2(40) path 'itemName',
             ItemQuantity number path 'itemQuantity',
             ItemUnitPrice number path 'itemUnitPrice"');
```

Create Statement 1

Create Statement 1 specifies a row pattern expression ("/PurchaseOrder//lineItem") and multiple column pattern expressions (i.e., "@itemNo", 'itemName', 'itemQuantity', and 'itemUnitPrice'). Although a path expression is used as a row pattern expression in this example, a row pattern expression and a column pattern in a create XML table index create statement may be a FLWR (For, Let, Where, Return) expression, such as in the XQuery query language.

Executing Create Statement 1 creates an XML table index. As indicated in Create Statement 1, the resulting XML table index (i.e., PO_TAB_INDEX) includes four columns, three of which are of type number and one of which is of type variable character string (varchar2). Purchase Order documents that are indexed by PO_TAB_INDEX are not required to conform to a schema as long as each indexed Purchase Order document includes a node (a) that satisfies the row pattern expression "/PurchaseOrder//lineItem" and (b) that has one or more of the following child nodes: @itemNo, itemName, itemQuantity, and itemUnitPrice.

However, current techniques for determining when an XML table index may be used are limited. In order to use an XML table index, XML queries must separately and exactly specify the row pattern expression and one or more column pattern expressions, just as they are defined for the XML table index. Query Example 1 is an example of such an XML query:

```
select v.ItemNo, v.ItemName, v.ItemUnitPrice
from purchaseOrder, XML Table('/PurchaseOrder//lineItem'
passing object_value
        Columns
            ItemNo number path '@itemNo',
            ItemName varchar2(40) path 'itemName',
            ItemQuantity number path 'itemQuantity',
            ItemUnitPrice number path 'itemUnitPrice') v
where v.itemQuantity = 3 and (v.itemName like 'C%' or v.itemName
like 'M%');
```

Query Example 1

XML queries that do not specify the exact row pattern expression and column pattern expressions will not be able to leverage an XML table index, even if the XML table index could be used to process those XML queries. Query Example 2 is an example of such an XML query:

```
select extract(value(p), '/PurchaseOrder//lineItem[itemQuantity=45]/
itemUnitPrice') from purchaseOrder p;
```

Query Example 2

Query Example 2 requests the itemUnitPrice of a "/PurchaseOrder//lineItem" node that has an itemQuantity child node whose value is 45. Because the path expression in Query Example 2 does not exactly match the row pattern expression of Create Statement 1, the Query Example 3 cannot be rewritten to use PO_TAB_INDEX.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
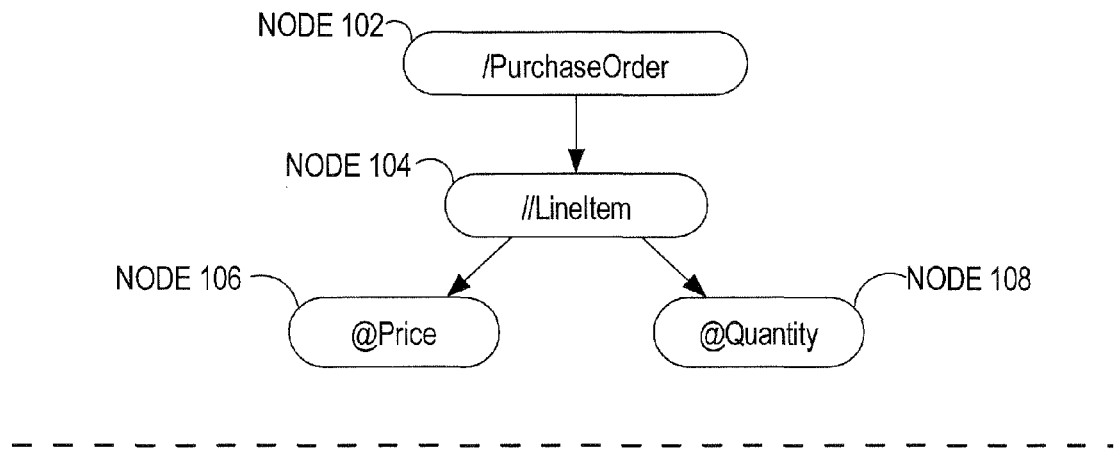
FIG. 1A depicts an example expression tree of an XML table index, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Multiple techniques are provided for determining whether an XML table index may be used when executing an XML query. One such technique includes generating one or more index definition path expressions by concatenating a row pattern expression and a column pattern expression of an XML table index. An index definition path expression (referred to herein as an "index expression") may be generated for each column pattern expression. A path expression in an XML query (referred to herein as a "query expression") is then compared to one or more of the index expressions. If the query expression matches an index expression, then the XML table index may be used to process the XML query.

In another technique, a determination is made as to whether an expression associated with an XML table index is semantically equivalent to an expression of an XML query even though the expressions are not the same. Such expressions may include variable expressions, value expressions, constructor expression, and/or path expressions.

In another technique, a determination is made as to whether the row pattern expression of an XML table index "contains" a query expression of an XML query. An example of containment is when a query expression includes a predicate that is not part of the row pattern expression.

Two or more of the above techniques may be used when determining whether a particular XML query may be rewritten to use an XML table index.

Embodiments of the invention are not limited to any particular query language. Non-limiting examples of query languages that may be used to specify an XML query include the SQL/XML query language and the XQuery query language.

Hereinafter, two expressions "match" if the two expressions are the same or are equivalent. Therefore, equivalent expressions match even if they are not the same. Unless otherwise specified, two expressions that are the same are also equivalent.

Row and Column Pattern Expression Concatenation

According to an embodiment of the invention, a row pattern expression and a column pattern expression of an XML table index are concatenated to generate an index definition path expression (i.e., "index expression"). A different index expression may be generated for each column pattern expression associated with the XML table index. The following is an example XML table index create statement:

```
create index po_xtidx on po p (value(p)) indextype is sys.xmltableindex
    parameters('XMLTABLE PO_TAB_INDEX
        "/PurchaseOrder//LineItem"
            columns
                "itemnum" integer PATH "@ItemNumber",
                "Description" varchar2(2000) PATH "Description",
                "Part" xmltype PATH "Part" VIRTUAL
                XMLTABLE PO_INDEX_PART
                "/Part" PASSING Part
                    Columns
                        "PartId" VARCHAR2(30) PATH "@Id",
                        "UnitPrice" NUMBER PATH "@UnitPrice",
                        "Quantity" INTEGER PATH "@Quantity"');
```

Create Statement 2

Execution of Create Statement 2 creates two XML table indexes: PO_TAB_INDEX and PO_INDEX_PART, which have a master-detail relationship. PO_TAB_INDEX is referred to as the master table and PO_INDEX_PART is referred to as the detail table.

PO_TAB_INDEX is associated with row pattern expression "/PurchaseOrder//LineItem" and column pattern expressions "@ItemNumber", "Description" and "Part". PO_INDEX_PART is associated with row pattern expression "/PurchaseOrder//LineItem/Part" and column pattern expressions "@Id", "@UnitPrice", "@Quantity". Although PO_TAB_INDEX and PO_INDEX_PART are both associated with three column pattern expressions, other XML table indexes may be associated with more or less column pattern expressions.

At least two index expressions may be generated for and associated with PO_TAB_INDEX: "/PurchaseOrder//LineItem/@ItemNumber" and "/PurchaseOrder//LineItem/Description". A subsequent XML query that includes a query expression that matches one of these two index expressions may then be rewritten to use PO_TAB_INDEX. For example, a user might submit the following query:

```
select extract(value(p), '/PurchaseOrder//LineItem/Description')
from po p
```

Query Example 3

In Query Example 3, the query expression "/PurchaseOrder//LineItem/Description" is compared with one or more index expressions associated with PO_TAB_INDEX. Because the query expression is the same as one of the index expressions, Query Example 3 may be rewritten to use PO_TAB_INDEX.

In a similar case, an XML query may include a query expression that includes a predicate. A query expression that includes a predicate might not match an index expression because, although possible, typical row pattern expressions do not include predicates. In an embodiment, a predicate of a query expression is removed. The predicate-less query expression is matched against a row pattern expression of an XML table index. The node portion of the predicate is then matched against a column pattern expression of the XML table index.

For example, a user submits the following query:

```
select extract(value(p),'/PurchaseOrder//LineItem/Part/@Id')
from po p
where existsNode(value(p),'/PurchaseOrder//LineItem/Part[@Id =
    "715515012720"]') = 1;
```

Query Example 4

In Query Example 4, the query expression of the existsNode operator (i.e., "/PurchaseOrder//LineItem/Part[@Id="715515012720"]") does not match an index expression of PO_TAB_INDEX or PO_INDEX_PART. The query expression includes a predicate (i.e., "[@Id="715515012720"]").

In this example, the predicate is removed from the query expression. The predicate-less query expression (i.e., "/PurchaseOrder//LineItem/Part") is matched against the row pattern expression of an XML table index. Because "/PurchaseOrder//LineItem/Part" is the same as the row pattern expression of PO_INDEX_PART, Query Example 4 may then be rewritten into Query Example 5, which references PO_INDEX_PART:

```
select XMLELEMENT("id", i.id)
from po p, PO_INDEX_PART i
where p.rowid = i.rid and i.id = '715515012720'
```

Query Example 5

Alternatively, after the predicate is removed from the query expression, the node portion of the predicate (i.e., "@Id") is then concatenated with the predicate-less query expression. The resulting query expression (i.e., "/PurchaseOrder//LineItem/Part/@Id") is matched against an index expression until a match is found. Because "/PurchaseOrder//LineItem/Part/@Id" is the same as one of the index expressions of PO_INDEX_PART, Query Example 4 may then be rewritten into Query Example 5.

In a similar predicate example, a query expression may include multiple predicates. The multiple predicates may be removed from the query expression, after which the predicate-less query expression is matched against a row pattern expression of an XML table index. Alternatively, based on each predicate, a separate query expression may be generated and compared with one or more index expressions of an XML table index. For example, the predicate portion of Query Example 4 may be "[@UnitPrice=36 and @Quantity=45]". Based on these predicates, two query expressions may be generated: "/PurchaseOrder//LineItem/Part/@UnitPrice" and "/PurchaseOrder//LineItem/Part/@Quantity". Because both query expressions are the same as one of the index expressions of PO_INDEX_PART, Query Example 4 may be rewritten to use PO_INDEX_PART.

Comparing Expression Trees

According to an embodiment of the invention, expression trees corresponding to an XML table index and an XML query are generated and subsequently compared to each other to determine whether the XML query may be rewritten to use the XML table index. An expression tree is generated for each index (and/or row pattern) expression of an XML table index. Alternatively, a single expression tree is generated for an XML table index even though the XML table index may include multiple column pattern expressions.

FIG. 1A depicts an example expression tree 100 of an XML table index, according to an embodiment of the invention. The XML table index is associated with row pattern expression "/PurchaseOrder//LineItem" and column pattern expressions "@Price" and "@Quantity". Hence, expression tree 100 comprises: a node 102 that corresponds to path element "/PurchaseOrder"; a node 104 that corresponds to path element "//LineItem"; a node 106 that corresponds to column pattern expression "@Price"; and a node 108 that corresponds to column pattern expression "@Quantity".

Figure 1B:
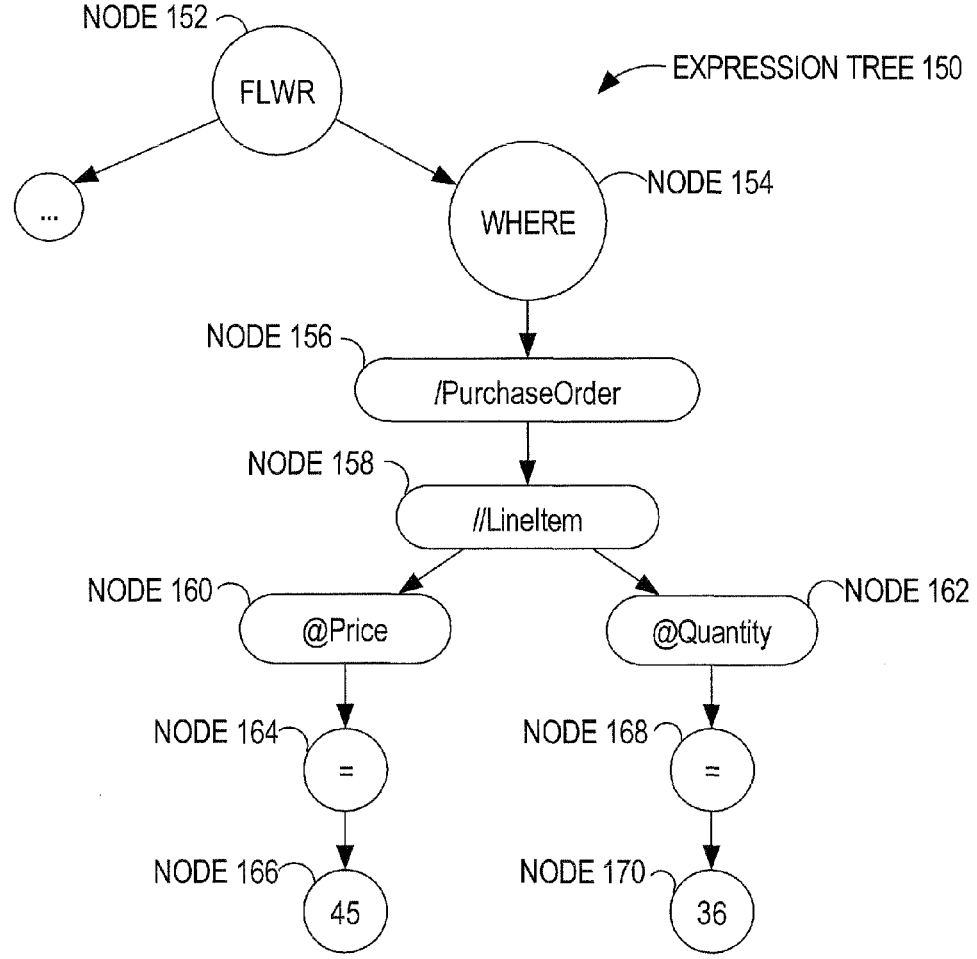
FIG. 1B depicts an example expression tree that is generated from an XML query, according to an embodiment of the invention.

FIG. 1B depicts an example expression tree 150 that is generated from an XML query, according to an embodiment of the invention. The XML query includes a FLWR expression and indicates at least the following:

```
for $i in po ...
    where /PurchaseOrder//LineItem[@Price = 45 and @Quantity = 36];
```

Expression tree 150 comprises: a node 152 that corresponds to the root of the FLWR expression; a node 154 that corresponds to a WHERE clause of the FLWR expression; and nodes 156-170 that correspond to different elements of the path expressions in the WHERE clause.

In an embodiment, an expression tree analyzer (ETA) compares expression trees by beginning at the root node of an expression tree associated with an XML table index (referred to as the "index expression tree") and a leaf node of the expression tree associated with an XML query (referred to as the "query expression tree"). The ETA traverses the query expression tree upward until a node of the query expression tree matches the root node of the index expression tree.

For example, node 102 is the root node of expression tree 100 and node 166 is a leaf node of expression tree 150. The ETA compares node 102 with node 166 to determine whether those nodes match. Because "/PurchaseOrder" does not match the integer 45, the ETA then compares node 102 with node 164. Alternatively, the ETA next compares node 102 with node 170 and, subsequently, with each leaf node of expression tree 150 until a match is found, or until all such leaf nodes are checked for a match.

Eventually, the ETA compares node 102 with node 156 and determines that a match is found because "/PurchaseOrder" of node 102 is the same as "/PurchaseOrder" of node 156. The ETA moves down both expression trees 100 and 150 in unison. The ETA eventually determines that expression tree 100 from root node 102 to leaf node 106 is the same as expression tree 150 from node 156 to node 160. Also, the ETA determines that expression tree 100 from root node 102 to leaf node 108 is the same as expression tree 150 from node 156 to node 162. Therefore, the ETA determines that the corresponding XML query may be rewritten so that a query processor may use the XML table index when processing the XML query.

Expression Equivalence

Determining whether a query expression and an index expression are the same does not account for a majority of XML queries that may use an XML table index. According to an embodiment, an XML query is rewritten to use an XML table index if the corresponding query expression is equivalent to an index expression of the XML table index, even if the query expression is not the same as the index expression. To illustrate, an XML table index might be created with the following create statement:

```
create index po_xtidx on po p (value(p)) indextype is sys.xmltableindex
    parameters('XMLTABLE PO_TAB_INDEX
    "/PurchaseOrder//LineItem"
        columns
            "itemnum" integer PATH "@ItemNumber",
            "Description" varchar2(2000) PATH "Description",
```

Create Statement 3

The row pattern expression of Create Statement 3 is "/PurchaseOrder//LineItem". However, a subsequent XML query may include a FLWR expression, such as "for $p in /PurchaseOrder//LineItem return $p" or "for $q in /PurchaseOrder//LineItem return $q". Neither of these expressions are the same as the row pattern expression of "/PurchaseOrder//LineItem." However, both expressions are semantically equivalent to the row pattern expression because the value portion of the FLWR expression (referred to herein as a "value expression") (i.e., "/PurchaseOrder//LineItem") is the same as the row pattern expression "/PurchaseOrder//LineItem".

Expression equivalence may be defined for the following XQuery expressions as follows:

Variable X is equivalent to variable Y if the respective value expressions of those variables are the same or equivalent.

Constructor expression A is equivalent to constructor expression B if the respective child expressions (i.e., any XQuery expression) of those expressions are the same or equivalent.

Path step P is equivalent to path step Q if the respective QNames of those path steps are the same or equivalent.

Function F is equivalent to function E if both functions have the same number of input parameters, each corresponding parameter has the same data type, the function body expressions are equivalent, and the return data types of both functions are the same.

A QName stands for "qualified name" and is a name that is subject to a namespace declaration. Namespace declarations are used in cases where name collisions (i.e., between different nodes) exist or may exist in an XML document.

The following is an example of variable equivalence, constructor expression equivalence, and path step equivalence.

```
create index po_xtidx on po p (value(p)) indextype is sys.xmltableindex
    parameters('XMLTABLE PO_TAB_INDEX
    "for $name in /PurchaseOrder/Requester return
    <name>{$name}</name>"
        columns
            "name" integer PATH "name"');
```

Create Statement 4

Execution of Create Statement 4 creates PO_TAB_INDEX with a row pattern expression of "for $name in /PurchaseOrder/Requester return <name>{$name}</name>". This row pattern expression includes variable expression "$name in /PurchaseOrder/Requester" and constructor expression "<name>{$name}</name>". Variable expression "$name in /PurchaseOrder/Requester" comprises variable name "$name" and value expression "/PurchaseOrder/Requester".

Subsequently, a user might submit the following XML query:

```
select t.fullname
from po p, xmltable('for $fullname in /PurchaseOrder/Requester return
    <fullname>{$fullname}</fullname>' passing p.object_value
        columns
            fullname integer path 'fullname') t;
```

Query Example 6

Although similar, the row pattern expression associated with PO_TAB_INDEX is not the same as the query expression of Query Example 6 (i.e., "for $fullname in /Purchase- Order/Requester return <fullname>{$fullname}</fullname>") at least because the variable name and constructor names are different than the variable name and constructor names of the row pattern expression.

The query expression of Query Example 6 includes variable expression "$fullname in /PurchaseOrder/Requester" and constructor expression "<fullname>{$fullname}</fullname>". Variable expression "$fullname in /PurchaseOrder/Requester" comprises variable name "$fullname" and value expression "/PurchaseOrder/Requester".

Although the query expression of Query Example 6 is not the same as the row pattern expression of Create Statement 4, the variable expression of the query expression is equivalent to the variable expression of Create Statement 4 because the corresponding value expressions are the same.

Also, the constructor expression of Query Example 6 is not the same as the constructor expression of Create Statement 4 because the constructor expressions have different QNames as their respective tag names. However, the constructor expressions are equivalent because their only child expressions, the respective variable names (i.e., "$name" and "$fullname"), are equivalent. The respective variable names are equivalent because the respective value expressions (i.e., "/PurchaseOrder/Requester") associated with the respective variables are the same. The variable name equivalence is more important than an exact match of variable names. For example, even if two variable names are the same, the variable names might not be equivalent because the variable names may refer to value expressions that do not match. The system may maintain a list of equivalent QNames. For example, QName 'fullname' and QName 'name' may correspond to each other in the list of equivalent QNames.

Additionally, path expression with one path step of 'name' of the constructor expression of Create Statement 4 is equivalent to path expression with one path step of 'fullname' of the constructor expression of Query Example 6 because the QNames "name" and "fullname" are equivalent. The QNames are equivalent because the respective variable names are equivalent (e.g., by examining the list of equivalent QNames).

In an embodiment, expression equivalence may be determined by comparing expression trees, as described above. Each node in an expression tree may be associated with a particular type. For example, a node may be of type "FLWR expression" if the node represents a FLWR expression. Such a node may be referred to as a FLWR node. Similarly, another node may be of type "variable expression" if the node represents a variable expression. Such a node may be referred to as a variable expression node.

Based on the expression equivalence defined above, a node from an index expression tree is compared to a node from a query expression tree depending on the type of each node. For example, if two nodes that are being compared are of type variable expression, then an ETA determines that the nodes match if the variable name nodes associated with each variable name node are the same or equivalent. The variable name nodes match if the value expression nodes associated with each variable name node are the same or equivalent. This type of recursion is performed until a match is determined.

Expression Containment

Some XML queries may include query expressions that specify a strict subset of the XML data specified by the row pattern expression (or by an index expression) of an XML table index. Such cases are referred to as "containment" cases. A row pattern expression is said to "contain" a query expression. The following is an example XML table index create statement:

```
create index po_xtidx on po p (value(p)) indextype is sys.xmltableindex
    parameters('XMLTABLE PO_TAB_INDEX
        "for $i in //LineItem return $i"
        columns
            "itemnum" integer PATH "@ItemNumber",
            "Description" varchar2(2000) PATH "Description"');
```

Create Statement 5

The index expression in Create Statement 5 is "for $i in //LineItem return $i". Index expressions of PO_TAB_INDEX include "//LineItem/@ItemNumber" and "//LineItem/Description".

The following is an example XML query:

```
select t.itemnum, t.description
from po p,
xmltable('for $i in //LineItem where $i[@ItemNumber =25] return $i'
    passing p.object_value
    columns
        itemnum integer path '@ItemNumber',
        Description varchar2(2000) Path 'Description') t;
```

Query Example 7

The query expression in Query Example 7 is "for $i in //LineItem where $i[@ItemNumber=25] return $i". Thus, whereas the query expression has a predicate (i.e., "where $i[@itemNumber=25]"), the row pattern expression of PO_TAB_INDEX does not. In other words, a row pattern expression of PO_TAB_INDEX contains the query expression. Query Example 7 may be rewritten to use PO_TAB_INDEX by moving the predicate to a WHERE clause of the rewritten query. Such moving of a predicate is referred to as "pushing out" the predicate.

"Pushing out" predicates applies to SQL/XML queries as well as XQuery queries, such as in Query Example 8:

```
select extract(value(p), '//LineItem[@ItemNumber=25]')
from po p;
```

Query Example 8

Query Example 8 may be rewritten as Query Example 9:

```
select extract(value(p), '//LineItem')
from po p
where existsNode(value(p), '//LineItem[@ItemNumber=25]');
```

Query Example 9

Another example of containment is when a query expression is a strict subset of the row pattern expression of an XML table index. To illustrate, a user submits the following XML query:

```
select count(*)
from po p
where xmlexists('$p/PurchaseOrder/LineItems/LineItem[@ItemNumber =
    25]' passing object_value as "p");
```

Query Example 10

The predicate-less portion of query expression of Query Example 10 is "/PurchaseOrder/LineItems/LineItem[@ItemNumber]", which is contained by row pattern expression "//LineItem" of PO_TAB_INDEX. Specifically, the XML data that is referenced by "/PurchaseOrder/LineItems/LineItem" is a strict subset of the XML data that that is referenced by "//LineItem". Therefore, Query Example 10 may be rewritten as:

```
select count(*)
from po p
where xmlexists('$p//LineItem[xs:decimal(@ItemNumber) = 25]'
    passing object_value as "p") and
    xmlexists('$p/PurchaseOrder/LineItems/LineItem[xs:
    decimal(@ItemNumber) = 25]' passing object_value as "p");
```

Query Example 11

The first "xmlexists" operator of Query Example 11 will use PO_TAB_INDEX to obtain a first set of results. The second "xmlexists" operator of Query Example 11, which is the same as the original "xmlexists" operator in Query Example 10, is then applied to the first set of results.

Data Type Check

In an embodiment, XML query rewrite also includes data type checking. The data type of a node (whether an attribute or an element) that is referenced in a query expression is analyzed to determine whether that data type matches the data type of an indexed node. Query Example 11 includes a data type casting (i.e., xs:decimal), which ensures that column itemnum of PO_TAB_INDEX is of type xs:decimal. If any of the data types do not match the corresponding data type in an XML table index, then the XML query cannot be rewritten to use the XML table index. For example, if Query Example 11 included " " around the '25', indicating that '25' is a string, then the data type check with column itemnum of PO_TAB__INDEX would result in no match.

Hardware Overview

Figure 2:
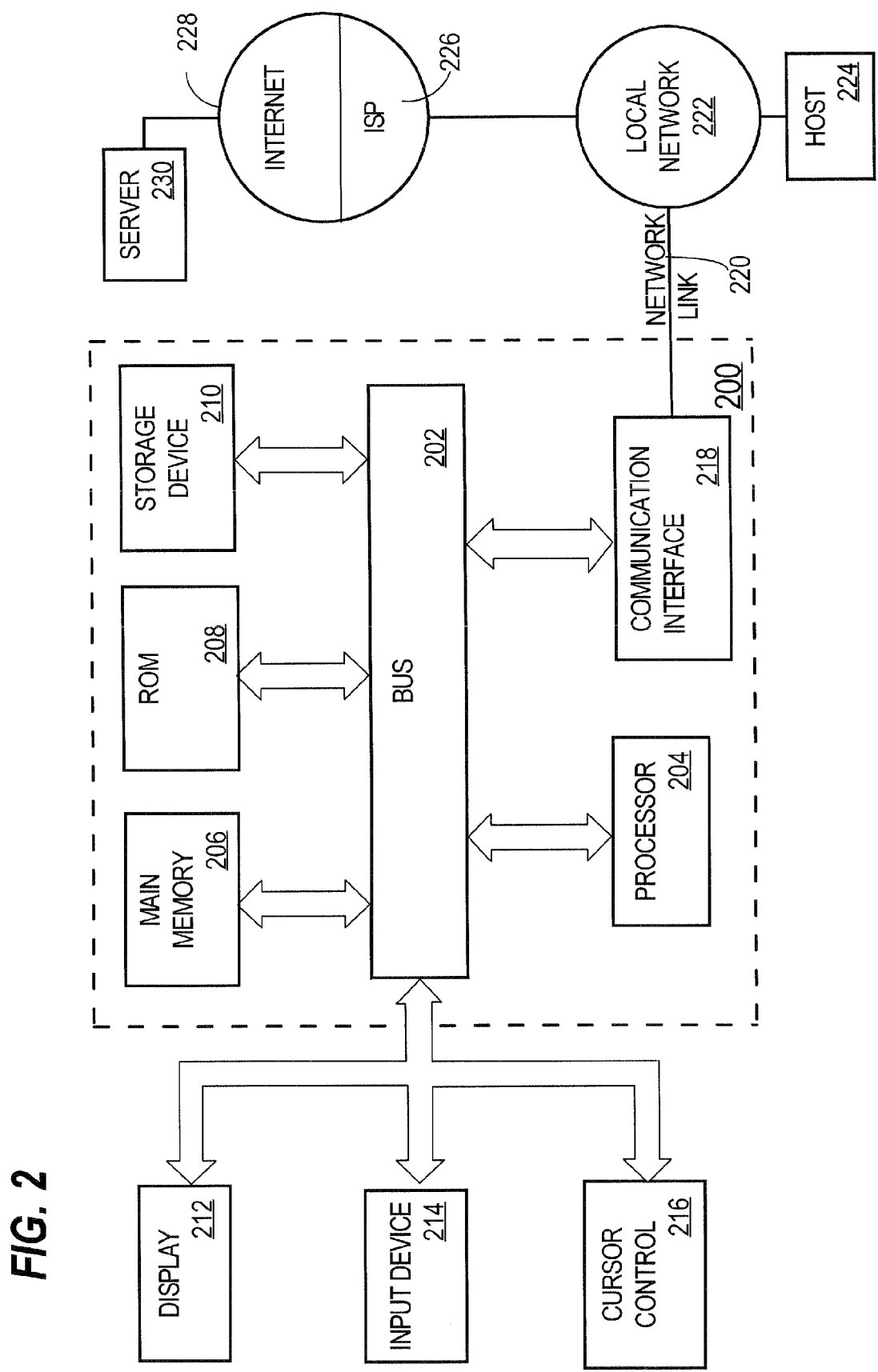
FIG. 2 depicts a computer system upon which an embodiment of the invention may be implemented.

FIG. 2 depicts a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to storage media and transmission media. Storage media includes both non-volatile media and volatile media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with pattern expressions of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for determining whether an index, whose definition of the index includes a row pattern expression, may be used in processing an XML query, the method comprising:
   analyzing the XML query, wherein the XML query includes a first particular set of one or more expressions;
   wherein none of the expressions in the first particular set is the same as the row pattern expression;
   determining that the index may be used in processing the XML query; and
   in response to determining that the index may be used in processing the XML query, rewriting the XML query to generate a new XML query that references the index;
   wherein the method is performed by one or more computing devices.

2. The method of claim 1, wherein execution of the new XML query causes the index to be accessed.

3. The method of claim 1, wherein the XML query conforms to the XQuery query language and the new XML query conforms to the SQL/XML query language.

4. The method of claim 1, wherein the XML query conforms to the SQL/XML query language.

5. The method of claim 1, wherein the XML query was rewritten from a previous XML query that was received at a database server.

6. The method of claim 1, wherein the definition also includes a set of one or more column pattern expressions, the method further comprising:
   generating a second particular set of one or more index expressions, wherein each index expression of the second particular set is generated based on the row pattern expression and a different column pattern of the set of one or more column patterns; and
   determining whether each expression of the first particular set is the same as an expression of the second particular set;
   wherein determining that the index may be used in processing the XML query includes determining that one or more expressions of the first particular set are the same as an expression of the second particular set.

7. The method of claim 1, further comprising:
   determining whether the row pattern expression is equivalent to one or more expressions in the first particular set;
   wherein determining that the index may be used in processing the XML query includes determining that the row pattern expression is equivalent to one or more expressions in the first particular set even though the row pattern expression is not the same as any expression in the first particular set.

8. The method of claim 7, wherein:
   determining whether the row pattern expression is equivalent to one or more expressions in the first particular set includes determining whether a first variable is equivalent to a second variable;
   the first variable is of the row pattern expression;
   the second variable is of an expression of the first particular set;
   determining whether the first variable is equivalent to the second variable includes determining whether a value expression of the first variable is the same as or equivalent to a value expression of the second variable.

9. The method of claim 7, wherein:
   determining whether the row pattern expression is equivalent to one or more expressions in the first particular set includes determining whether a first constructor expression is equivalent to a second constructor expression;
   the first constructor expression is of the row pattern expression;
   the second constructor expression is of an expression of the first particular set;
   determining whether the first constructor expression is equivalent to the second constructor expression includes determining whether a child expression of the first constructor expression is the same as or equivalent to a child expression of the second constructor expression.

10. The method of claim 7, wherein:
determining whether the row pattern expression is equivalent to one or more expressions in the first particular set includes determining whether a first path step is equivalent to a second path step;
the first path step is of the row pattern expression;
the second path step is of an expression of the first particular set;
determining whether the first path step is equivalent to the second path step includes determining whether a QName of the first path step is the same as or equivalent to a QName of the second path step.

11. The method of claim 10,
determining whether a QName of the first path step is equivalent to a QName of the second path step includes determining whether the QName of the first path step corresponds to the QName of the second path step in a list of equivalent QNames.

12. The method of claim 1, further comprising:
determining that the index may be used in processing the XML query includes determining that a path expression of the first particular set references only a strict subset of the XML data that is referenced by the row pattern expression.

13. The method of claim 12, wherein:
the path expression of the first particular set includes a predicate;
the row pattern expression does not include the predicate;
new XML query includes (a) a first operator whose operand is a predicate-less form of the expression of the first particular set and (b) a second operator whose operand includes the predicate.

14. The method of claim 1, wherein:
an expression of the first particular set includes a predicate that comprises a reference to a particular node and a value;
the method further comprising determining whether the value is of the same data type as the values stored in a column of the index;
wherein the column corresponds to a node that is the same as the particular node.

15. A machine-readable storage medium carrying instructions for determining whether an index, whose definition of the index includes a row pattern expression, may be used in processing an XML query, wherein the instructions, when executed by one or more processors, cause:
analyzing the XML query, wherein the XML query includes a first particular set of one or more expressions;
wherein none of the expressions in the first particular set is the same as the row pattern expression;
determining that the index may be used in processing the XML query; and
in response to determining that the index may be used in processing the XML query, rewriting the XML query to generate a new XML query that references the index.

16. The machine-readable storage medium of claim 15, wherein execution of the new XML query causes the index to be accessed.

17. The machine-readable storage medium of claim 15, wherein the XML query conforms to the XQuery query language and the new XML query conforms to the SQL/XML query language.

18. The machine-readable storage medium of claim 15, wherein the XML query conforms to the SQL/XML query language.

19. The machine-readable storage medium of claim 15, wherein the XML query was rewritten from a previous XML query that was received at a database server.

20. The machine-readable storage medium of claim 15, wherein the definition also includes a set of one or more column pattern expressions, wherein the instructions, when executed by the one or more processors, further cause:
generating a second particular set of one or more index expressions, wherein each index expression of the second particular set is generated based on the row pattern expression and a different column pattern of the set of one or more column patterns; and
determining whether each expression of the first particular set is the same as an expression of the second particular set;
wherein determining that the index may be used in processing the XML query includes determining that one or more expressions of the first particular set are the same as an expression of the second particular set.

21. The machine-readable storage medium of claim 15, wherein the instructions, when executed by the one or more processors, further cause:
determining whether the row pattern expression is equivalent to one or more expressions in the first particular set;
wherein determining that the index may be used in processing the XML query includes determining that the row pattern expression is equivalent to one or more expressions in the first particular set even though the row pattern expression is not the same as any expression in the first particular set.

22. The machine-readable storage medium of claim 21, wherein:
determining whether the row pattern expression is equivalent to one or more expressions in the first particular set includes determining whether a first variable is equivalent to a second variable;
the first variable is of the row pattern expression;
the second variable is of an expression of the first particular set;
determining whether the first variable is equivalent to the second variable includes determining whether a value expression of the first variable is the same as or equivalent to a value expression of the second variable.

23. The machine-readable storage medium of claim 21, wherein:
determining whether the row pattern expression is equivalent to one or more expressions in the first particular set includes determining whether a first constructor expression is equivalent to a second constructor expression;
the first constructor expression is of the row pattern expression;
the second constructor expression is of an expression of the first particular set;
determining whether the first constructor expression is equivalent to the second constructor expression includes determining whether a child expression of the first constructor expression is the same as or equivalent to a child expression of the second constructor expression.

24. The machine-readable storage medium of claim 21, wherein:
determining whether the row pattern expression is equivalent to one or more expressions in the first particular set includes determining whether a first path step is equivalent to a second path step;
the first path step is of the row pattern expression;
the second path step is of an expression of the first particular set;

determining whether the first path step is equivalent to the second path step includes determining whether a QName of the first path step is the same as or equivalent to a QName of the second path step.

25. The machine-readable storage medium of claim 24, wherein:

determining whether a QName of the first path step is equivalent to a QName of the second path step includes determining whether the QName of the first path step corresponds to the QName of the second path step in a list of equivalent QNames.

26. The machine-readable storage medium of claim 15, wherein the instructions, when executed by the one or more processors, further cause:

determining that the index may be used in processing the XML query includes determining that a path expression of the first particular set references only a strict subset of the XML data that is referenced by the row pattern expression.

27. The machine-readable storage medium of claim 26, wherein:

the path expression of the first particular set includes a predicate;

the row pattern expression does not include the predicate;

new XML query includes (a) a first operator whose operand is a predicate-less form of the expression of the first particular set and (b) a second operator whose operand includes the predicate.

28. The machine-readable storage medium of claim 15, wherein:

an expression of the first particular set includes a predicate that comprises a reference to a particular node and a value;

the method further comprising determining whether the value is of the same data type as the values stored in a column of the index;

wherein the column corresponds to a node that is the same as the particular node.

* * * * *